US012601206B2

(12) United States Patent
Szegeny et al.

(10) Patent No.: US 12,601,206 B2
(45) Date of Patent: Apr. 14, 2026

(54) MOTOR VEHICLE LOCK

(71) Applicant: KIEKERT AKTIENGESELLSCHAFT, Heiligenhaus (DE)

(72) Inventors: Peter Szegeny, Engelskirchen (DE); Holger Schiffer, Meerbusch (DE); Michael Scholz, Essen (DE); Andreas Schmitz, Velbert (DE); Ömer Inan, Dorsten (DE); Manuel Reusch, Düsseldorf (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 38 days.

(21) Appl. No.: 18/689,227

(22) PCT Filed: Aug. 19, 2022

(86) PCT No.: PCT/DE2022/100618
§ 371 (c)(1),
(2) Date: Mar. 5, 2024

(87) PCT Pub. No.: WO2023/036362
PCT Pub. Date: Mar. 16, 2023

(65) Prior Publication Data

US 2024/0376752 A1 Nov. 14, 2024

(30) Foreign Application Priority Data

Sep. 8, 2021 (DE) ..................... 10 2021 123 251.1

(51) Int. Cl.
*E05B 81/06* (2014.01)
*E05B 77/34* (2014.01)
(Continued)

(52) U.S. Cl.
CPC .............. *E05B 81/06* (2013.01); *E05B 77/34* (2013.01); *E05B 79/20* (2013.01); *E05B 81/34* (2013.01); *E05B 81/90* (2013.01); *E05B 85/02* (2013.01)

(58) Field of Classification Search
CPC .......... E05B 81/06; E05B 81/34; E05B 81/90; E05B 77/34; E05B 79/20; E05B 85/02
(Continued)

(56) References Cited

U.S. PATENT DOCUMENTS 11,072,949 B2 * 7/2021 Strole .................. B62D 33/037
2009/0236863 A1 * 9/2009 Akizuki .................. E05B 81/14 292/201
(Continued)

FOREIGN PATENT DOCUMENTS

CN 112727269 A * 4/2021 ............. E05B 79/20
DE 44 25 423 C1 8/1995
(Continued)

OTHER PUBLICATIONS

International Search Report mailed Nov. 29, 2022, for priority International Application No. PCT/DE2022/100618.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism consisting essentially of a rotary latch and a pawl. Furthermore, an electromotive drive is provided at least for unlocking the locking mechanism. In addition, a manually loadable emergency actuation element is provided for unlocking the locking mechanism in the event of an emergency, said emergency actuation element being arranged at least in part
(Continued)

outside a lock housing and acting on the locking mechanism by means of at least one transmission element to perform an emergency unlocking operation. According to the invention, the emergency actuation element, in combination with the transmission element, is coupled to a triggering lever via at least one through-hole in the lock housing.

13 Claims, 4 Drawing Sheets

(51) Int. Cl.

| | |
|---|---|
| ***E05B 79/20*** | (2014.01) |
| ***E05B 81/34*** | (2014.01) |
| ***E05B 81/90*** | (2014.01) |
| ***E05B 85/02*** | (2014.01) |

(58) Field of Classification Search
USPC ........................................................... 70/237
See application file for complete search history.

(56) References Cited

U.S. PATENT DOCUMENTS

| | | | | |
|---|---|---|---|---|
| 2011/0107800 A1* | 5/2011 | Barbier | ................... | E05B 77/28<br>70/237 |
| 2011/0204673 A1* | 8/2011 | Cumbo | ................... | E05B 81/06<br>70/141 |
| 2012/0000258 A1* | 1/2012 | Akizuki | .................. | E05B 85/06<br>70/91 |
| 2017/0068265 A1 | 3/2017 | Subramanian | | |
| 2018/0355642 A1* | 12/2018 | Cumbo | ................... | E05B 83/36 |
| 2019/0136590 A1* | 5/2019 | Patane | .................... | E05B 81/14 |
| 2024/0167303 A1* | 5/2024 | Reusch | ................... | E05B 81/90 |

FOREIGN PATENT DOCUMENTS

| | | | | | |
|---|---|---|---|---|---|
| DE | 102 20 732 A1 | 12/2003 | | |
| DE | 102013007403 A1 * | 10/2014 | ............. | E05B 81/90 |
| DE | 102017124525 A1 * | 4/2019 | ............. | E05B 81/14 |
| DE | 102019127109 A1 | 4/2021 | | |
| WO | 9900572 A1 | 1/1999 | | |
| WO | WO-2017103175 A1 * | 6/2017 | ............. | E05B 77/34 |
| WO | 2019076402 A1 | 4/2019 | | |

* cited by examiner

MOTOR VEHICLE LOCK

This application is a national phase of International Patent Application No. PCT/DE2022/100618 filed Aug. 19, 2022, which claims priority to German Patent Application No. 10 2021 123 251.1 filed Sep. 8, 2021, each of which is hereby incorporated herein by reference in its entirety.

FIELD OF DISCLOSURE

The invention relates to a motor vehicle lock, in particular a motor vehicle door lock, with a locking mechanism consisting substantially of a rotary latch and a pawl, further with an electromotive drive at least for opening the locking mechanism, and with a manually actuatable emergency actuating element for emergency opening of the locking mechanism, wherein the emergency actuating element is arranged outside a lock housing and operates with the interposition of at least one transmission element on the locking mechanism for emergency opening.

BACKGROUND OF DISCLOSURE

Nowadays, motor vehicle locks and particularly motor vehicle door locks are increasingly being equipped with an electromotive drive, at least for opening the locking mechanism, for reasons of convenience. For this reason, such motor vehicle locks are also referred to as electric locks. Consequently, the locking mechanism is not usually mechanically coupled to an external door handle, for example, in order to open the locking mechanism. Instead, actuation of the outside door handle leads to sensor actuation, which in turn is used via a control unit to actuate the electromotive drive, which in turn opens the locking mechanism. For this purpose, the electromotive drive usually works on a triggering lever, either directly or indirectly. The triggering lever is usually used to lift the pawl from its latching engagement with the rotary latch when the locking mechanism is closed. This releases a locking bolt previously caught by the rotary latch. The corresponding vehicle door can be opened accordingly.

Such electric locks have proven themselves in practice because they require practically no force from the operator on the outside door handle and are also gentle and quiet in operation. However, their reliable operation requires that the electromotive drive is supplied with sufficient electrical energy. The problem at this point is that the main energy source, which is usually located in the vehicle interior in the form of one or more batteries, is completely or partially discharged after a long period of inactivity or due to a defect. As a result, the motor vehicle lock in question can no longer be opened. In order to nevertheless enable emergency actuation, various approaches are being pursued in the prior art.

For example, DE 10 2019 127 109 A1 describes a motor vehicle lock with emergency actuation, in which the electromotive drive is equipped with an emergency energy source for emergency actuation of the lever chain. For this purpose, the lever chain has an emergency operating lever, which is inoperative in its normal position and is at least transferred to its operating position closing the emergency operating lever chain by means of the emergency operating drive. This is intended to provide a simple and cost-effective emergency actuation of the lever chain. However, the design effort required for the electromotive drive and the emergency energy source is not insignificant. In addition, malfunctions due to an at least partially discharged emergency power source cannot be completely ruled out.

In the further prior art according to WO 2019/076402 A1, the procedure is such that an operating lever chain for emergency opening of the locking mechanism is implemented in a motor vehicle door lock. There is also a control element that directly or indirectly blocks the operating lever chain in normal operation and releases it for emergency opening. The control element is equipped with an electric motor with drive element. In addition, the control element can optionally block or release a flexible connecting element for coupling the operating lever chain to a handle. In this case, too, an additional electromotive drive is ultimately implemented in connection with an operating lever chain for emergency operation, which corresponds to increased complexity in terms of design.

In the generic prior art according to US 2011/0107800 A1, a lock cylinder outside a lock housing is provided and realized as an emergency operating element. A key inserted into the locking cylinder can be used for emergency opening of the locking mechanism as an alternative to an electromotive drive. For this purpose, the locking cylinder is coupled to the triggering lever via a connecting rod.

The prior art has generally and fundamentally proven itself when it comes to realizing an emergency operation of the locking mechanism, for example in the event of failure of the electromotive drive or a battery or main energy source of the motor vehicle that feeds it. However, complex solutions with their own drive, operating lever chain and emergency power source are often propagated at this location. If the generic prior art uses a manually operated emergency operating element outside the lock housing, the basic problem at this location is that moisture or dirt can penetrate the inside of the lock housing via the connecting rod as a transmission element and the associated forced opening and reach the electromotive drive. This poses a risk of damage to the electromotive drive.

For reasons of cost and weight, such electromotive drives often work with components or gears made of plastic. Dirt or moisture penetrating the lock housing at this point can cause abrasive damage to such plastic gear wheels and cause permanent functional impairment or even complete failure. The invention as a whole seeks to remedy this.

SUMMARY OF DISCLOSURE

The invention is based on the technical problem of further developing a motor vehicle lock and, in particular, a motor vehicle door lock in such a manner that, taking into account a simple, functional and cost-effective design, permanent functionality is ensured even over long time scales.

In order to solve this technical problem, the invention proposes in a motor vehicle lock of the type and in particular a motor vehicle door lock that the emergency operating element is coupled in connection with the transmission element to a triggering lever with the interposition of at least one through-hole in the lock housing.

The through-hole in the lock housing can be designed and realized in such a manner that neither dirt nor moisture can penetrate the lock housing. This applies all the more to an advantageous embodiment of the invention in which the through-hole has at least one seal. In addition, it has proven to be particularly advantageous in this context if the through-hole is arranged in a dry room housing part of the lock housing. It is also advantageous if the emergency operating element extends at least partially the through-hole.

In fact, a particularly preferred variant of the invention provides that the lock housing is divided into a dry room housing part and a wet room housing part. The locking mechanism is located in the wet room housing part, whereas the electromotive drive is located in the dry room housing part of the lock housing. The triggering lever for motorized opening of the locking mechanism, which is typically actuated by the electromotive drive, can be designed in two parts as a result of this specific arrangement, wherein one lever part of the triggering lever is arranged in the dry room housing part of the lock housing and interacts here with the electromotive drive. A further second lever part of the triggering lever, on the other hand, is located in the wet room housing part of the lock housing and acts directly or indirectly on the pawl to lift it away from its engagement with the rotary latch to open the locking mechanism. Both lever parts are coupled to one another in a rotationally fixed manner and usually engage through a rotating through-hole with seal, which separates the dry room housing part of the lock housing from the wet room housing part and ensures a seal against dust, moisture, etc.

As a result, the dry room housing part of the lock housing is already protected from dirt and moisture ingress due to its design. According to the invention, this also applies taking into account the additional emergency operating element provided. This is because the emergency operating element is coupled to the triggering lever in connection with the transmission element by interposing the through-hole in the lock housing, wherein the through-hole is located in the dry room housing part of the lock housing in question. This allows the emergency operating element to work by interposing the transmission element on the lever part of the triggering lever, which is located in the dry room housing part of the lock housing.

Since the relevant lever part is sealed with respect to the corresponding lever part in the wet room housing part of the lock housing and, in addition, the emergency operating element including the transmission element operates via the likewise sealed through-hole in the lock housing onto the triggering lever or the lever part of the triggering lever in the dry room housing part of the lock housing, a hermetically sealed design is observed overall, particularly of the dry room housing part of the lock housing. As the electromotive drive is located in the relevant dry room housing part of the lock housing, its function is not impaired even over long time scales. This applies even if individual or all gearwheels, worm gears, etc. as components of the electromotive drive are produced entirely or partially from plastic. In addition, moisture kept away from the dry room housing part of the lock housing cannot endanger the permanent function of the electric motor located here as a further component of the electromotive drive, even over long time scales.

The dry room housing part and the wet room housing part of the lock housing are defined on the one hand in a housing shell and on the other hand in a housing cover, each made of plastic, and are separated from one another by a dividing wall, which generally only has the rotating feed-through already described and mentioned above, through which the two lever parts of the triggering lever are coupled together in a rotationally fixed and sealing manner. These are the main advantages.

In a further advantageous embodiment, the through-hole in the lock housing is designed as a rotating/sliding through-hole. This means that the emergency operating element can operate by rotating and/or pushing the transmission element on the triggering lever. This is because the through-hole allows both a rotary movement in this context and a sliding movement. Combined rotary and sliding movements are also possible for emergency operation or emergency opening of the locking mechanism and are comprised according to the invention.

According to an alternative, the transmission element can be connected to the triggering lever in question. In this context, it is even possible that the transmission element is molded onto the triggering lever and both form a structural unit or a one-piece component. It has also proven to be advantageous if the transmission element is designed as a transmission lever mounted in or on the lock housing. For example, the transmission element may be designed as a linearly retractable slider mounted in the lock housing, which, when actuated with the aid of the emergency operating element, actuates the triggering lever for emergency opening of the locking mechanism.

As an alternative, however, the transmission lever in question can also be mounted on the outside of the lock housing. In this case, the design is usually such that the transmission lever reaches the through-hole in the lock housing. A comparable sealed rotating through-hole can be realized as in the case of the triggering lever, whose two lever parts provide a torsion-proof coupling through the dividing wall between the dry room housing part and the wet room housing part of the lock housing.

The emergency operating element as such can be a rigid element designed as a pin or slider, for example. In principle, the emergency operating element can also be designed to be flexible. In this case, the emergency operating element is, by way of example and not limitation, a cable or a Bowden cable. In principle, the two variants mentioned above can also be combined with one another. In this case, the emergency operating element is designed with a rigid component in the form of a pin or slider and also has a flexible component in the form of a cable or Bowden cable.

The result is a motor vehicle lock and particularly a motor vehicle door lock that is functionally reliable and durable and provides a simple and cost-effective emergency operation system. This is because the emergency operating element is located outside the lock housing, for example behind a cover of a door panel, an exterior mirror, etc., and can be easily activated manually by a user if the electromotive drive fails. Since the emergency operating element operates on the transmission element and thus the locking mechanism for emergency opening and is coupled to the transmission element in question by interposing the at least one through-hole in the lock housing, perfect sealing of the lock housing can be realized and converted. This applies particularly to the dry room housing part of the lock housing, in which the electromotive drive and at least one lever part of the triggering lever are located. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
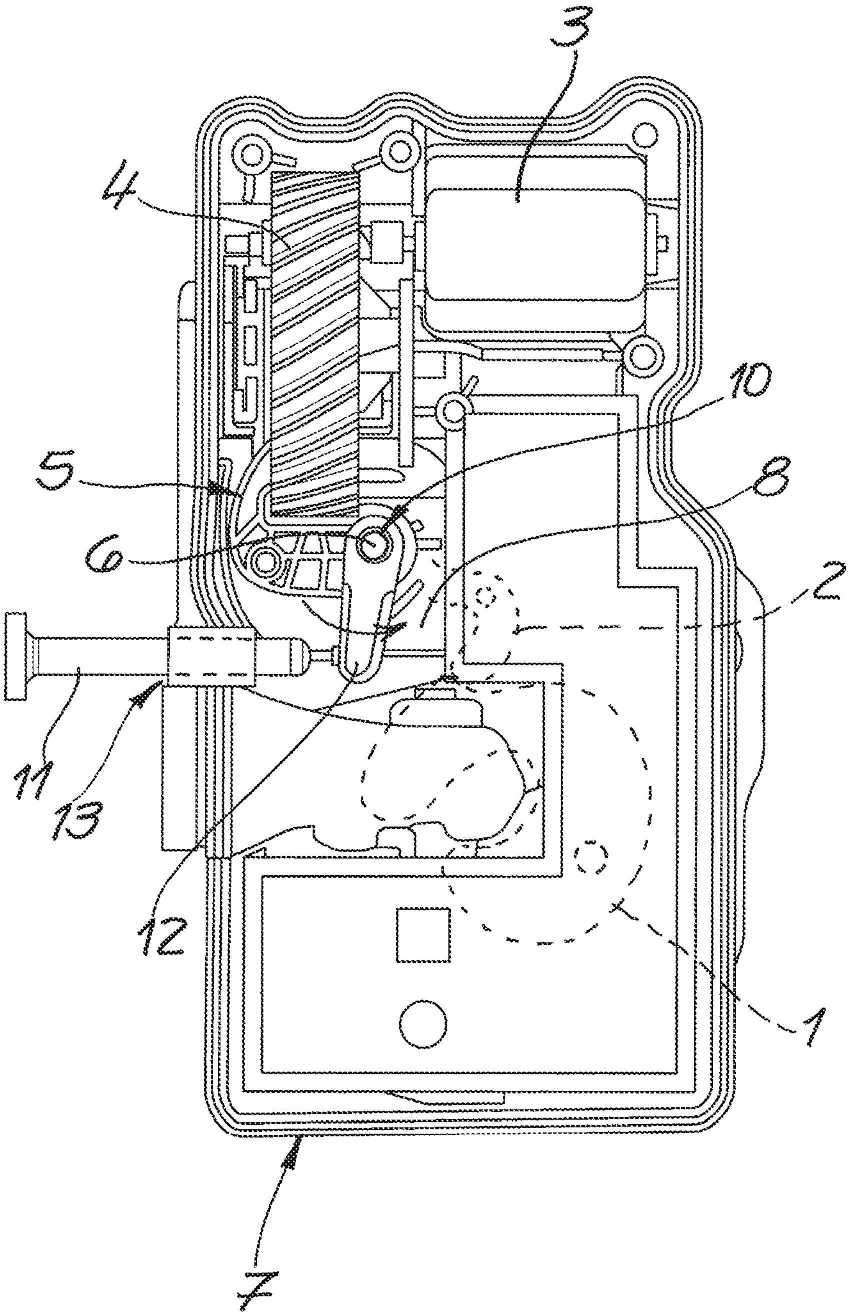
FIG. 1 shows a schematic view of the motor vehicle lock according to the invention in a first variant with the housing cover removed.

The drawings show a motor vehicle lock which is not limited to a motor vehicle door lock. For this purpose, the motor vehicle lock or motor vehicle door lock has a locking mechanism 1, 2 consisting substantially of rotary latch 1 and pawl 2, which are only indicated in FIG. 1. In addition, the basic design includes an electromotive drive 3, 4, which operates on a triggering lever 5, which in turn lifts the pawl 2 from its latching engagement with the rotary latch 1 in the closed state of the locking mechanism 1, 2.

The electromotive drive 3, 4 consists substantially of an electric motor 3 and a drive wheel 4 or gear wheel driven on the output side by the electric motor 3. According to the exemplary embodiment, the drive wheel 4 has a three-dimensionally extending helical contour on its surface facing the triggering lever 5. As a result, rotations of the drive wheel 4 cause the triggering lever 5 attached to it to pivot about its axis 6 via the contour to open the locking mechanism 1, 2, namely in the counter-clockwise direction indicated in FIG. 1. As a result, the pawl 2 is lifted from its latching engagement with the rotary latch 1 when the locking mechanism 1, 2 is in the closed state and a locking bolt previously caught by the rotary latch 1 is released. The motor vehicle door, which is part of the motor vehicle door lock and is not shown, is opened by an electric motor.

In order to initiate the electromotive opening of the locking mechanism 1, 2, a control unit is usually provided which acts on the electric motor 3 and is not explicitly shown, which in turn queries a sensor. The sensor can be a switch on an outside door handle. If the outside door handle is operated, the actuation of the switch ensures that the control unit interprets this as an opening signal and accordingly actuates the electric motor 3 in such a manner that it causes the drive wheel 4 to rotate in such a manner that the triggering lever 5—as described—is pivoted in the counter-clockwise direction indicated in FIG. 1. Of course, this only applies as an example. This is because the electric opening or electromotive opening of the locking mechanism 1, 2 can also be carried out without sensors, for example following a question/answer dialog of the control unit with a user-side identification element.

Figure 3A:
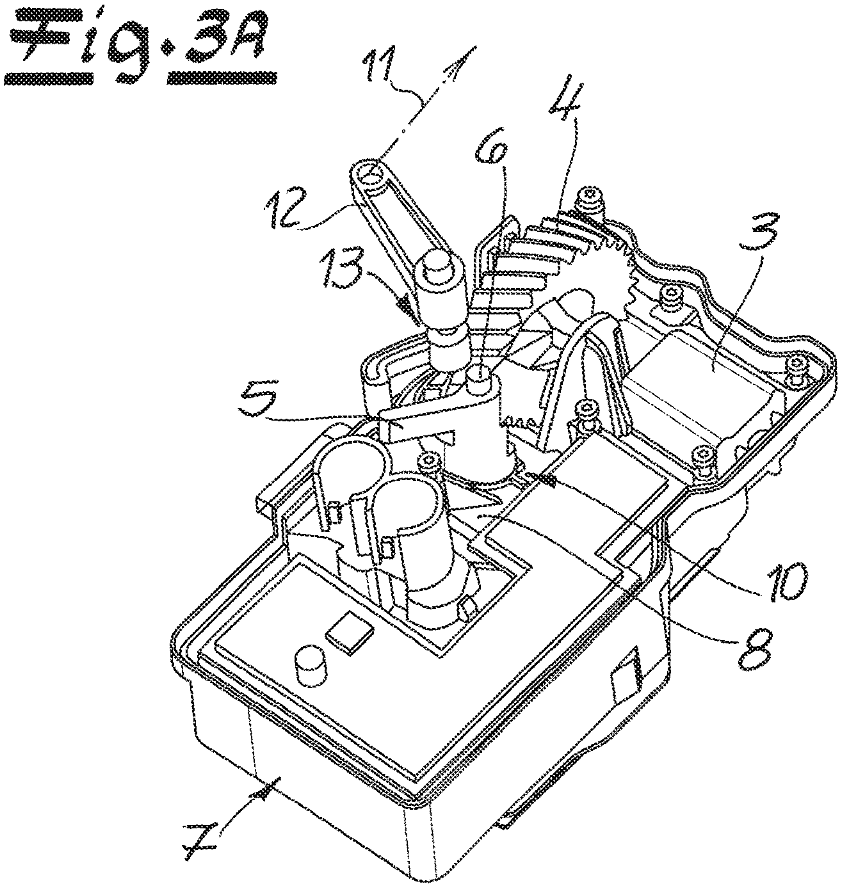
Figure 3B:
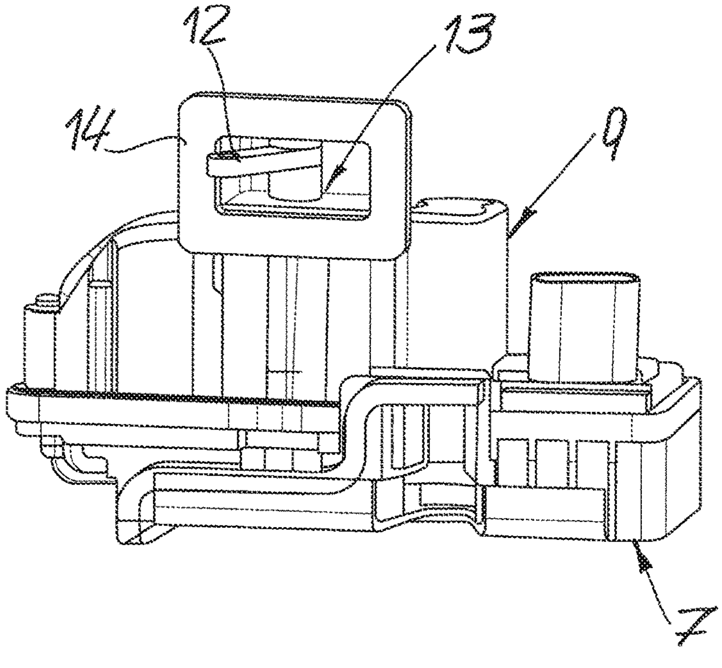

The motor vehicle door lock shown is accommodated as a whole in a lock housing 7, 8, 9 and is encased in the lock housing 7, 8, 9 in question. The lock housing 7, 8, 9 has a housing shell 7 and a housing cover 9, which can be seen in particular in FIG. 3B. The housing shell 7 and the housing cover 9 are separated from one another by a dividing wall 8. In this manner, the housing shell 7 in connection with the dividing wall 8 define a wet room housing part 7, 8. Further, a dry room housing part 8, 9 of the lock housing 7, 8, 9 can be recognized, which is defined and described by the dividing wall 8 in connection with the housing cover 9.

It can be seen that the locking mechanism 1, 2 is predominantly arranged in the wet room housing part 7, 8. The wet room housing part 7, 8 of the lock housing 7, 8, 9 is not protected against environmental influences and moisture because an inlet mouth is realized at this point, into which the locking bolt not shown enters for interaction with the rotary latch 1 of the locking mechanism 1, 2. In contrast, the dry room housing part 8, 9 of the lock housing 7, 8, 9 is practically hermetically sealed against such environmental influences. This can be attributed to the fact that the triggering lever 5 has a lever part in the dry room housing part 8, 9, which can be seen in FIG. 1. This lever part is non-rotatably coupled to another lever part of the triggering lever 5 in the wet room housing part 7, 8. The triggering lever 5 passes through a sealed rotating through-hole 10 in the dividing wall 8, which is the only connection between the wet room housing part 7, 8 and the dry room housing part 8, 9 of the lock housing 7, 8, 9 and is therefore sealed. This prevents any moisture or dust penetrating into the wet room housing part 7, 8 from reaching the dry room housing part 8, 9. In this manner, the electromotive drive 3, 4 in particular is permanently protected against environmental influences and its functional reliability is also provided over long time scales.

Figure 2:
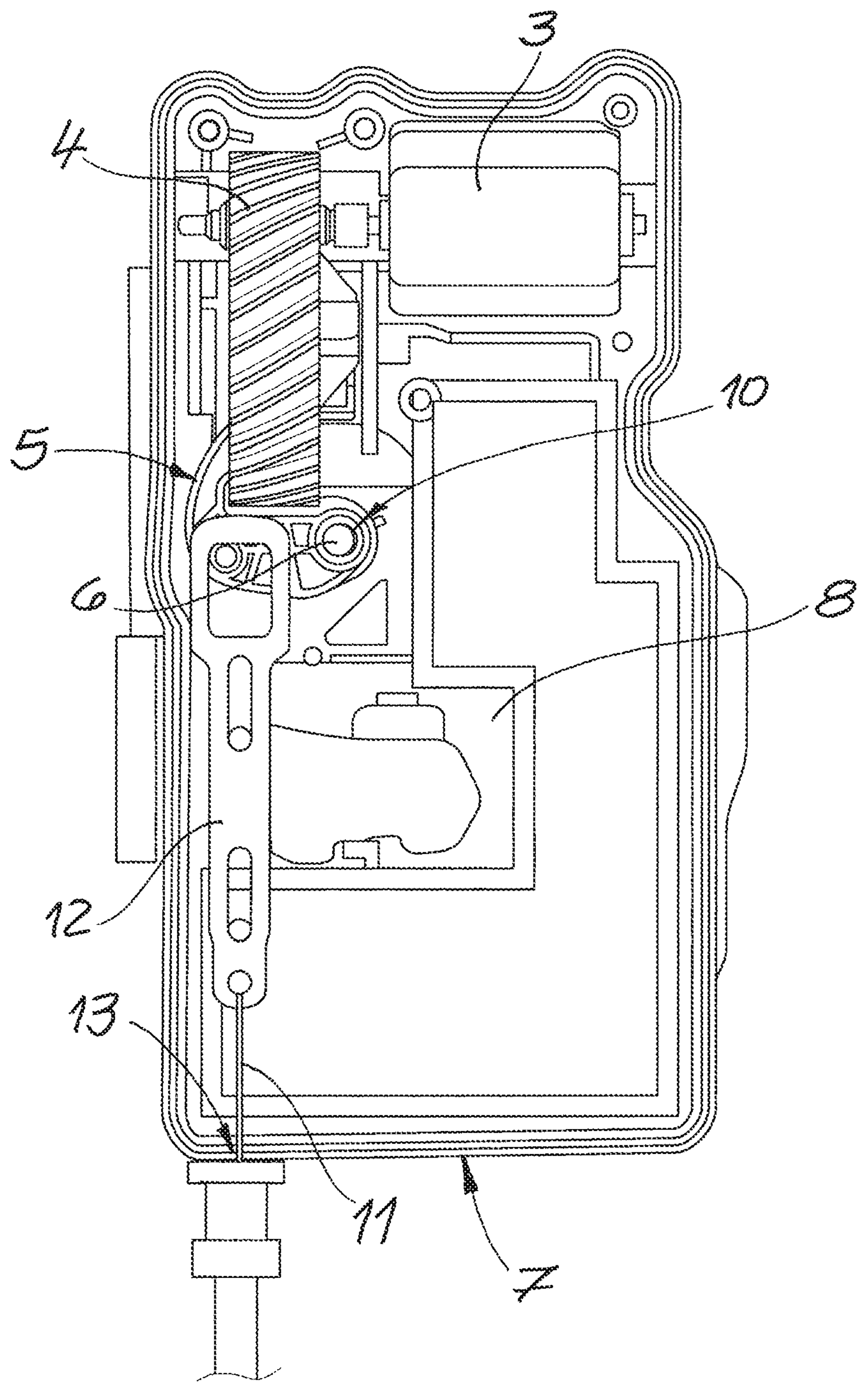
FIG. 2 shows a further second embodiment with a representation comparable to that of FIG. 1, FIGS. 3A and 3B show a third embodiment variant in different views
Figure 4A:
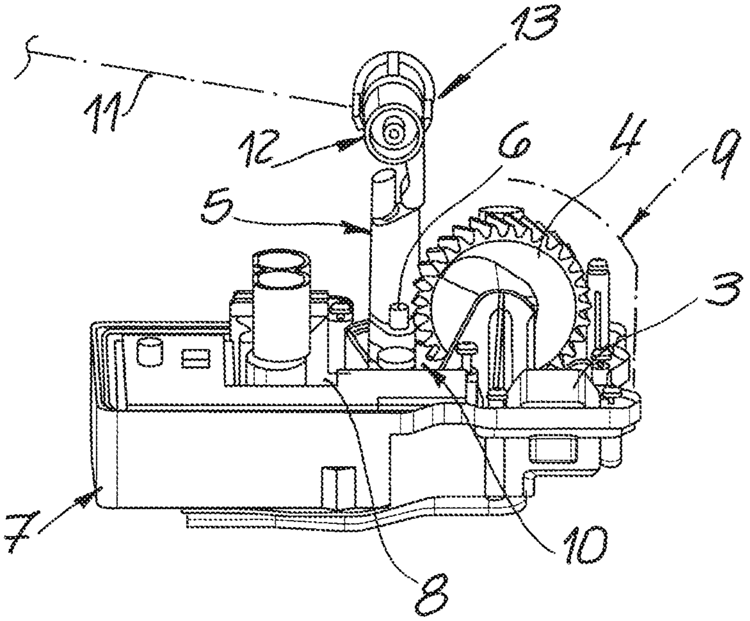
FIGS. 4A and 4B show a further design variant again in different views.
Figure 4B:
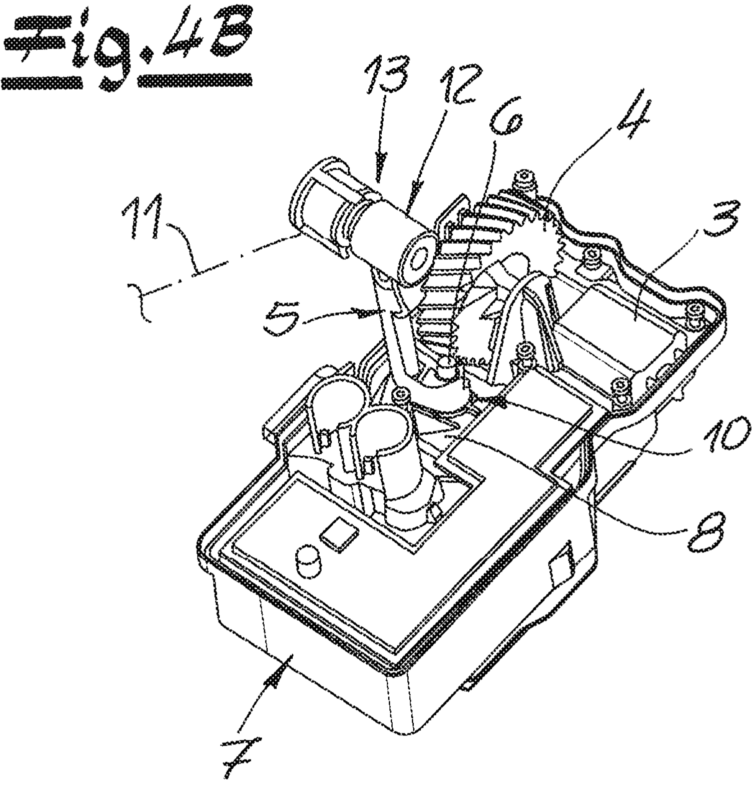

The basic structure of the motor vehicle door lock according to the invention also includes a manually actuated emergency operating element 11. The emergency operating element 11 is arranged at least partially outside the lock housing 7, 8, 9, as can be seen from the various exemplary embodiments in FIGS. 2, 3A, 3B and 4A and 4B. In addition, the emergency operating element 11 operates by interposing at least one transmission element 12 on the locking mechanism 1, 2 for emergency opening. The transmission element 12 is one that is connected to the triggering lever 5. In the variant according to FIG. 1, the design is such that the transmission element 12 and the triggering lever 5 define a one-piece component 5, 12. In contrast, the transmission element 12 of the variant shown in FIG. 2 is a slider mounted in the lock housing 7, 8, 9, which is connected to the triggering lever 5. The variant according to FIGS. 3A and 3B uses a transmission lever mounted on the outside of the lock housing 7, 8, 9 as transmission element 12. The exemplary embodiment shown in FIGS. 4A and 4B is comparable.

What is now decisive and essential to the invention is the fact that the emergency operating element 11 is coupled to the triggering lever 5 in connection with the transmission element 12 with the interposition of at least one through-hole 13 in the lock housing 7, 8, 9. In the variant according to FIG. 1, it is possible to proceed in such a manner that the emergency operating element 11 at least partially penetrates the relevant through-hole 13, as shown in FIGS. 1 and 2. In this case, the through-hole 13 is in any case designed with or without a seal in such a manner that a tight closure of the lock housing 7, 8, 9 is observed in the area of the through-hole 13. In principle, however, the through-hole 13 can also have an additional and separate seal 14, as is observed in the exemplary embodiment according to FIGS. 3A and 3B.

Furthermore, and according to an advantageous embodiment, the through-hole 13 is arranged in the dry room housing part 8, 9 of the lock housing 7, 8, 9. As a result, neither dust nor moisture can penetrate into the dry room housing part 8, 9 of the lock housing 7, 8, 9 via the through-hole 13.

The through-hole 13 can be a sliding through-hole as shown in the exemplary embodiment according to FIGS. 1 and 2. In principle, however, a rotating through-hole as through-hole 13 is also conceivable at this location, as shown in FIGS. 3A, 3B, 4A, 4B. Combinations of a rotating/sliding through-hole are also possible in this context.

If the transmission element 12 is designed as a transmission lever mounted on the outside of the lock housing 7, 8, 9, the procedure is carried out in accordance with the exemplary embodiments in FIGS. 3A, 3B, 4A, 4B in such a manner that the transmission lever in question engages through-hole 13. As a result, the transmission lever or transmission element 12 can be easily coupled on the output side and outside the lock housing 7, 8, 9 with the emergency operating element 11 for its actuation.

For its part, the emergency operating element 11 can be rigidly designed as a pin or slider, for example, as shown in FIG. 1. In addition, variants are also conceivable in such a manner that the emergency operating element 11 is flexibly designed as a cable or Bowden cable, for example, as shown in detail in the exemplary embodiments of FIGS. 2, 3A, 3B and 4A, 4B.

The emergency operating element 11 can be actuated manually. For this purpose, the emergency operating element 11 may be located behind a cover and becomes accessible after partially loosening this cover. The cover can be an interior cover of a door, an exterior cover, a cover of an exterior mirror, etc., as long as it is ensured that the manually actuatable emergency operating element 11 is accessible in the event of failure of the electromotive drive 3, 4 and can be actuated by a user for emergency opening of the locking mechanism 1, 2.

LIST OF REFERENCE NUMBERS

1, 2 Locking mechanisms
1. Rotary latch
2. Pawl
3, 4 Drive
3 Electric motor
4 Drive wheel
5 Triggering lever
5, 12 Component
6 Axis
7, 8, 9 Lock housing
7, 8 Wet room housing part
8, 9 Dry room housing part
7 Housing shell
8 Dividing wall
9 Housing cover
11 Emergency operating element
12 Transmission element
13 Through-hole

The invention claimed is:

1. A motor vehicle lock comprising:

a locking mechanism including a rotary latch and a pawl, and a lock housing that houses the locking mechanism, an electromotive drive at least for opening the locking mechanism, and a manually actuatable emergency operating element having at least one transmission element for emergency opening of the locking mechanism, wherein the emergency operating element is arranged at least partially outside the lock housing and operates by the transmission element operating on the locking mechanism for emergency opening, and a triggering lever, wherein the emergency operating element is coupled to the triggering lever in connection with the transmission element with the interposition of at least one through-hole in the lock housing, wherein the housing includes a dry room housing part and a wet room housing part with the rotary latch and the pawl separated by a dividing wall, wherein the triggering lever extends through an opening in the dividing wall and moves with respect to an axis extending through the opening in the dividing wall such that the triggering lever includes a first lever part positioned in the dry room housing part and a second lever part positioned in the wet room housing part, wherein the triggering lever rotates with respect to the axis extending through the opening, wherein the housing further includes a seal that sealingly engages the triggering lever at the opening in the dividing wall, and wherein the at least one through-hole in the lock housing is formed in the dry room housing part.

2. The motor vehicle lock according to claim 1, wherein the emergency operating element engages with the triggering lever at least partially through the through-hole.

3. The motor vehicle lock according to claim 1, wherein the through-hole has at least one second seal.

4. The motor vehicle lock according to claim 1, wherein the through-hole is a rotating or a sliding through-hole.

5. The motor vehicle lock according to claim 1, wherein the transmission element is directly connected to the triggering lever.

6. The motor vehicle lock according to claim 1, wherein the transmission element is a transmission lever mounted in or on the lock housing.

7. The motor vehicle lock according to claim 1, wherein the transmission element is mounted on an outside of the lock housing and passes through the through-hole into the dry room housing part.

8. The motor vehicle lock according to claim 1, wherein the emergency operating element is rigid.

9. The motor vehicle lock according to claim 1, wherein the emergency operating element is flexible.

10. The motor vehicle lock according to claim 8, wherein the emergency operating element is a pin or a slider.

11. The motor vehicle lock according to claim 9, wherein the emergency operating element is a cable or Bowden cable.

12. The motor vehicle lock according to claim 1, wherein the electromotive drive is positioned in the dry room housing part and the locking mechanism is positioned in the wet room housing part.

13. The motor vehicle lock according to claim 5, wherein the triggering lever and the transmission element are molded together as a one-piece construction.

* * * * *